Nov. 30, 1943.                H. M. MARTIN                2,335,682
              DIRECT CURRENT SYSTEM OF ELECTRIC DISTRIBUTION
                        Filed Dec. 22, 1941
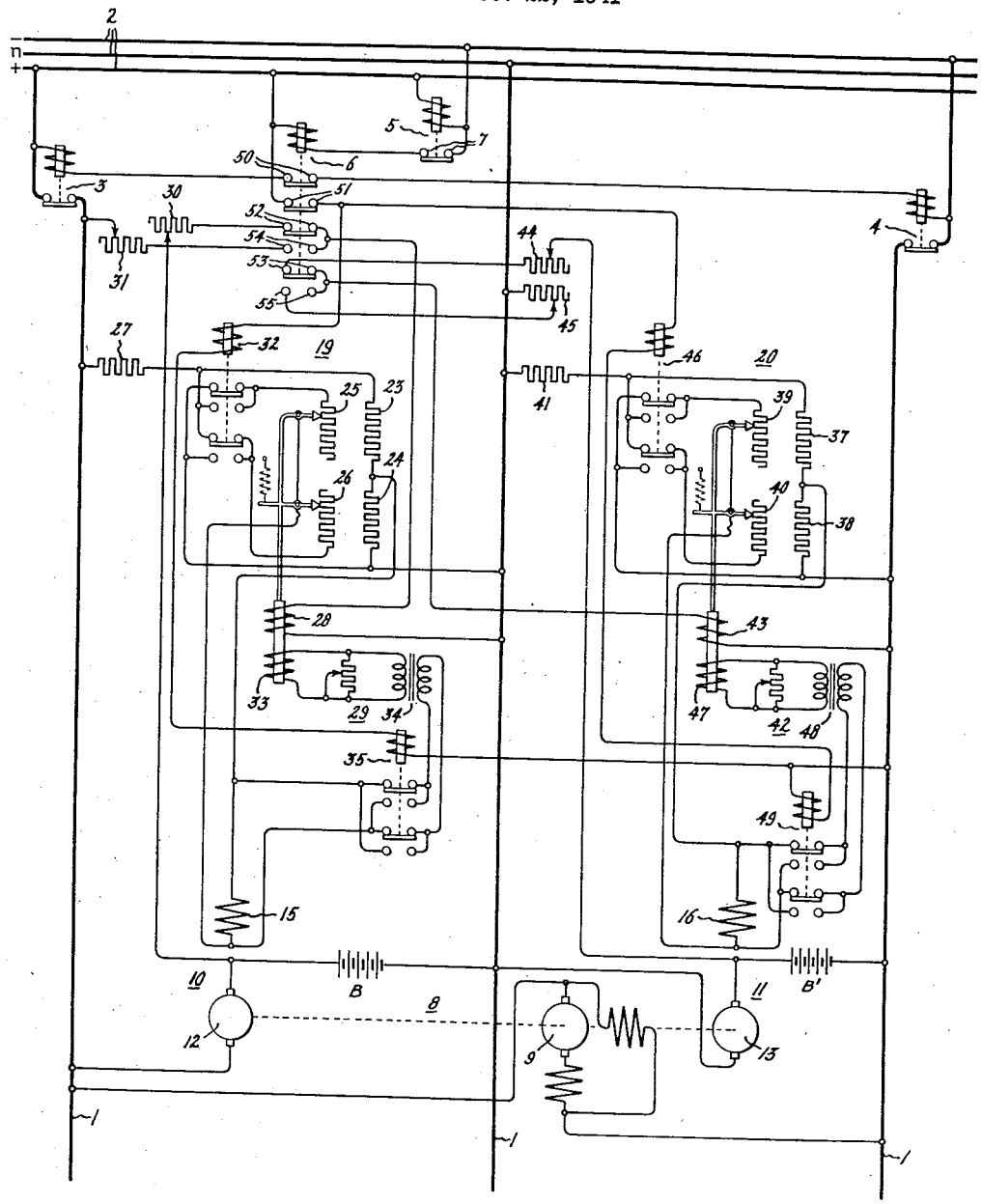
Inventor:
Harold M. Martin,
by Harry E. Dunham
His Attorney.

Patented Nov. 30, 1943

2,335,682

UNITED STATES PATENT OFFICE 2,335,682

DIRECT CURRENT SYSTEM OF ELECTRIC DISTRIBUTION

Harold M. Martin, Schenectady, N. Y., assignor to General Electric Company, a corporation of New York Application December 22, 1941, Serial No. 423,891

6 Claims. (Cl. 320—33)

My invention relates to direct current systems of electric distribution and particularly to such systems in which it is very essential that the distribution system shall be energized at a substantially constant voltage.

Heretofore, it has been proposed to provide in such systems an auxiliary stand-by storage battery which is normally maintained in a charged condition and which is connected to the direct current distribution system so that it supplies current thereto in case the main source of current therefor fails. Such systems have usually consisted of a battery which normally floated across the distribution circuit and have been provided with suitable means for charging the battery while the main source of current was connected to the distribution circuit. Such prior systems, however, were not operative in connection with batteries, such as the well known Edison type, which require a charging voltage that is much higher than their normal discharging voltage and which, also, have a relatively large voltage drop between their fully charged and their fully discharged values.

One object of my invention is to provide an arrangement of apparatus whereby batteries of the Edison or similar type may be used as auxiliary sources of power for a direct current distribution circuit in case the source of power therefor fails.

Another object of my invention is to provide an arrangement of apparatus whereby a storage battery of the Edison or similar type may be recharged and maintained in a sufficiently charged condition while the direct current distribution circuit is being supplied from its main source of current and is automatically connected to the distribution circuit when the main source of power therefor fails and whereby the voltage of the distribution circuit is maintained at a predetermined value while the battery is supplying current thereto.

In accordance with my invention, I provide a direct current dynamoelectric machine in series with the battery across the direct current distribution circuit and control the volage of the dynamoelectric machine in response to the battery voltage while the distribution circuit is being supplied from the main source of current so that the dynamoelectric machine acts as a booster to increase the voltage applied to the battery to a sufficient value to charge the battery. When, however, the main source fails, I control the voltage of the dynamoelectric machine in response to the voltage of the distribution circuit so that the dynamoelectric machine operates to buck down the battery voltage when it is too high and to boost the voltage of the battery when the voltage thereof is below the circuit voltage.

My invention will be better understood from the following description when taken in connection with the accompanying drawing, the single figure of which diagrammatically illustrates a three-wire direct current system of distribution embodying my invention, and its scope will be pointed out in the appended claims.

Referring to the drawing, I represents a three-wire direct current distribution circuit which is normally connected to a three-wire direct current supply circuit 2 by the two contactors 3 and 4 which respectively connect together the positive conductors of the circuits 1 and 2 and the negative conductors of the circuits 1 and 2. The opening of the contactors 3 and 4 is effected simultaneously in response to a failure of the supply circuit 2 by means of a voltage responsive relay 5 and an associated control relay 6 connected between the positive and negative conductors of the supply circuit 2. The voltage relay 5 controls contacts 7 in an energizing circuit for the control relay 6 so that the relay 6 is energized when the supply circuit voltage is above a predetermined value and is deenergized when the supply circuit voltage is below a predetermined value. When energized, the control relay 6 in turn completes a series energizing circuit for the operating windings of the contactors 3 and 4 between the positive and negative conductors of the supply circuit 2.

For supplying current to the distribution circuit 1 when the main supply circuit 2 is disconnected therefrom, I provide two storage batteries B and B' respectively connected between the positive and neutral conductors and between the neutral and negative conductors of the distribution circuit. I also provide a motor-generator set 8 comprising a direct current motor 9, connected between the positive and negative conductors of the distribution circuit 1, and two dynamoelectric machines 10 and 11 driven by the motor 9. The armature winding 12 of the dynamoelectric machine 10 is connected in series with the battery B between the positive and the neutral conductors of the distribution circuit 1, and the armature winding 13 of the dynamoelectric machine 11 is connected in series with the battery B' between the neutral and negative conductors of the distribution circuit 1. The dynamoelectric machines 10 and 11 are respectively provided with the field windings 15 and 16, which are respectively arranged to be connected between the positive and neutral conductors and between the neutral and negative conductors of the direct current circuit 1 in a manner which will hereinafter be described.

In accordance with my invention, I control the energizations of the field windings 15 and 16 so that when the main supply circuit 2 is connected to the distribution circuit 1, the voltages of the dynamoelectric machines 10 and 11 are respectively controlled in response to the voltages across the batteries B and B', and when the supply circuit 2 is disconnected from the distribution circuit 1, the voltages of the dynamoelectric machines 10 and 11 are respectively controlled in response to the voltages between the positive and neutral conductors and between the neutral and negative conductors of the distribution circuit 1.

In the particular embodiment of my invention shown in the drawing, I accomplish this result by providing suitable voltage regulators 19 and 20 for respectively controlling the energizations of the field windings 15 and 16. The voltage regulator 19 comprises two fixed resistors 23 and 24 and two adjustable resistors 25 and 26, which are so connected as to form a Wheatstone bridge. The two fixed resistors 23 and 24 and another fixed resistor 27 are connected in series between the positive and neutral conductors of the distribution circuit 1, and the two adjustable resistors 25 and 26 are connected in a series circuit which is in parallel with the series-connected fixed resistors 23 and 24. One terminal of the field winding 15 is connected to a point between the series-connected fixed resistors 23 and 24, and the other terminal of the field winding 15 is connected to a point between the series-connected adjustable resistors 25 and 26. The resistances of resistors 25 and 26 are arranged to be adjusted simultaneously by a suitable operating magnet 29 comprising a voltage winding 28, which is arranged to be connected so as to be energized in response to the voltage of the battery B when the control relay 6 is energized and in response to the voltage between the positive and neutral terminals of the distribution circuit 1 when the relay 6 is deenergized. Since the battery charging voltage, which the regulator 19 maintains constant while the distribution circuit 1 is being supplied with current from the main supply circuit 2, is materially higher than the distribution circuit voltage which the regulator 19 maintains constant while the distribution circuit is being supplied with current from the battery B, suitable adjustable resistors 30 and 31 are respectively connected in series with the voltage winding 28 when it is connected across the battery B and when it is connected between the positive and neutral conductors of the distribution circuit 1 so as to effect the proper calibration of the regulator whenever the connection of the voltage winding 28 thereof is changed. The adjustable resistors 25 and 26 are so controlled by the magnet 29 that an increase in the energization of the magnet 29 effects an increase in the resistance of the resistor 25 and a decrease in the resistance of the resistor 26. During the normal operation of the system when the machine 10 is operating as a booster to increase the voltage across the battery B to the desired charging value, a relay 32, which is controlled by the position of the relay 6, connects the adjustable resistors 25 and 26 so that the resistors 23 and 26 are respectively in the adjacent branches of the Wheatstone bridge which are connected to the positive conductor of the distribution circuit 1 through the fixed resistor 27, and the resistors 24 and 25 are respectively in the adjacent branches of the Wheatstone bridge which are connected to the neutral conductor of the distributor circuit 1. Therefore, when the charging voltage is too high, the resistances of the resistors 25 and 26 are adjusted relatively to each other by the magnet 29 so as to decrease the current through the field winding 15 and thereby effect a decrease in the voltage of the machine 10 which is then operating as a booster. When the charging voltage is too low, the relative resistances of the resistors 25 and 26 are adjusted by the magnet 29 so as to increase the current through the field winding 15 and thereby effect an increase in the voltage of the machine 10. When the main supply circuit 2 fails so that the battery B supplies current to the distribution circuit 1 and the regulator 19 operates to maintain a constant voltage between the positive and neutral conductors of the distribution circuit 1, it is necessary to decrease the excitation of the machine 10 so as to decrease the voltage thereof when the distribution circuit voltage is too low. Therefore, when the main supply circuit 2 fails so that the control relay 6 is deenergized, the relay 32 operates to change the connections of the resistors 25 and 26 so that resistors 23 and 25 are respectively in the adjacent branches of the Wheatstone bridge which are connected to the positive conductor of the distribution circuit 1 through the resistor 27, and the resistors 24 and 26 are respectively in the adjacent branches of the Wheatstone bridge which are connected to the neutral conductor of the distribution circuit 1. When the distribution circuit voltage is too low while the battery B is supplying current to the circuit 1, the relative resistances of the resistors 25 and 26 are adjusted by the magnet 29 so as to decrease the current through the field winding 15 and thereby effect a decrease in the voltage of the machine 10. When the distribution circuit voltage is too high, the resistances of the resistors 25 and 26 are adjusted relatively to each other by the magnet 29 so as to increase the current through the field winding 15 and thereby effect an increase in the voltage of the machine 10. It will be obvious that during the time the battery B is supplying current to the distribution circuit 1, the connections of the resistors 23—26 and field winding 15 are such that the magnet 29 may cause the current through the field winding 15 to be reduced to zero and, in fact, to be increased in the opposite direction so as to overcome the residual magnetism of the field circuit and cause the machine 10 to operate as a booster. In this manner, it is possible to supply a much larger proportion of the total charge of the battery B to the distribution circuit since current may still be supplied to the distribution circuit after the voltage of the battery has decreased below the voltage which it is desired to maintain constant across the distribution circuit.

In the particular arrangement shown in the drawing, the operating magnet 29 of the regulator 19 is provided with an anti-hunting winding 33, which is connected in parallel with the field winding 15 through a suitable stabilizing transformer 34 so that any change in the current through the field winding 15 effects in a manner well known in the regulating art a compensating effect in the magnet 29. Since a current change of a predetermined character in the field winding 15 effects a different change in the voltage being maintained constant by the regulator 19 when the battery is being charged than when the battery is being discharged, it is necessary in order to obtain the proper compensating effect to reverse the connections between the field winding 15 and the anti-hunting winding 33 whenever the connections of the voltage winding 28 are changed. For accomplishing this result, I provide a reversing relay 35, the energization of which is controlled by the position of the control relay 6. This reversing relay 35 controls the connections between the stabilizing transformer 34 and the field winding 15 so as to reverse these connections whenever the control relay 6 changes its position.

The voltage regulator 20 for the dynamoelectric machine 11 is similar to the voltage regulator 19 and comprises two fixed resistors 37 and 38 and two adjustable resistors 39 and 40 which are so connected as to form a Wheatstone bridge. The two fixed resistors 37 and 38 and another fixed resistor 41 are connected in series between the neutral and negative conductors of the distribution circuit 1, and the adjustable resistors 39 and 40 are connected in a series circuit which is in parallel with the series-connected fixed resistors 37 and 38. One terminal of the field winding 16 is connected to a point between the fixed resistors 37 and 38, and the other terminal of the field winding 16 is connected to a point between the adjustable resistors 39 and 40. The resistances of the resistors 39 and 40 are arranged to be adjusted by a suitable operating magnet 42 comprising a voltage winding 43, which is arranged to be connected so as to be energized in response to the voltage of the battery B' when the relay 6 is energized and in response to the voltage between the neutral and negative terminals of the distribution circuit 1 when the relay 6 is deenergized. Suitable adjustable resistors 44 and 45 are respectively connected in series with the voltage winding 43 when it is connected across the battery B' and when it is connected between the neutral and negative conductors of the distribution circuit 1 so as to effect the proper calibration of the regulator when the connections of the voltage winding 43 are changed. The adjustable resistors 39 and 40 are so controlled by the magnet 42 that an increase in the energization of the magnet 42 effects an increase in the resistance of the resistor 39 and a decrease in the resistance of the resistor 40. Therefore, during the normal operation of the system when the machine 11 is operating as a booster to increase the voltage across the battery B' to the desired charging value, a reversing relay 46 which is controlled by the relay 6 connects the adjustable resistors 39 and 41 so that the resistors 37 and 40 are respectively in the adjacent branches of the Wheatstone bridge which are connected to the neutral conductor of the distribution circuit 1 through the resistor 41, and the resistors 38 and 39 are respectively in the adjacent branches of the Wheatstone bridge which are connected to the negative conductor of the distribution circuit 1. When, however, the main supply circuit 2 fails so that the battery B' supplies current to the distribution circuit 1 and the regulator 20 operates to maintain a constant voltage between the neutral and negative conductors of the distribution circuit 1, the reversing relay 46 changes the connections of the resistors 39 and 40 so that the resistors 37 and 39 are respectively in the adjacent branches of the Wheatstone bridge which are connected to the neutral conductor of the distribution circuit 1, and the resistors 38 and 40 are respectively in the adjacent branches of the Wheatstone bridge which are connected to the negative conductor of the distribution circuit 1.

The regulator 20 is also provided with an anti-hunting winding 47, which is connected in parallel with the field winding 16 through a suitable stabilizing transformer 48 so that any change in the current through the field winding 16 effects in a manner well known in the regulating art a compensating effect in the magnet 42. A reversing relay 49, similar to the reversing relay 35 of the regulator 19, is provided so as to reverse the connections between the field winding 16 and the stabilizing transformer 48 whenever the control relay 6 changes its position.

The operation of the arrangement shown in the drawing will be apparent from the heretofore description. When the main supply circuit 2 is energized so that the voltage between the positive and negative conductors is sufficient to maintain the contact 7 of the relay 5 closed, the control relay 6 is energized and its contacts 50 complete the series energizing circuit of the operating windings of the contactors 3 and 4 to effect the connection of the distribution circuit 1 to the supply circuit 2. The contacts 51 of the relay 6 complete energizing circuits for the reversing relays 32, 35, 46, and 49, and the contacts 52 and 53 of the relay 6 respectively connect the voltage windings 28 and 43 of the regulators 19 and 20 across the batteries B and B' so that the currents through the field windings 15 and 16 are regulated in a well known manner so that predetermined constant charging voltages are maintained across the batteries B and B'.

In case the main supply circuit 2 fails so that the voltage impressed across the voltage responsive relay 5 decreases below a predetermined value and effects the opening of the relay contact 7, the control relay 6 becomes deenergized, and by opening its contacts 50 effects the opening of the contactors 3 and 4 so as to disconnect the distribution circuit 1 from the main supply circuit 2. The opening of the contacts 51 of the control relay 6 effects the deenergization of the reversing relays 32, 35, 46 and 49 so as to reverse the connections of the adjustable resistors 25, 26, 39 and 40 and the connections of the anti-hunting windings 33 and 47. By opening its contacts 52 and 53 and closing its contacts 54 and 55, the control relay 6 effects the disconnection of the voltage windings 28 and 43 from across the batteries B and B' respectively and effects the connections of these windings respectively between the positive and neutral conductors and between the neutral and negative conductors of the distribution circuit 1. The regulators 19 and 20 then operate in a well known manner to regulate the currents through the field windings 15 and 16 respectively so that predetermined voltages are maintained between the positive and neutral conductors and between the neutral and negative conductors of the distribution circuit 1.

It will be observed that as the batteries discharge and their terminal voltages decrease, the bucking voltages of the machines 10 and 11 are gradually decreased until they become zero, and in some cases, the currents through the field windings 15 and 16 may even build up in the reverse direction and cause the machines 10 and 11 to operate as boosters in order to maintain the desired voltages across the distribution circuit 1.

When the voltage of the supply circuit 2 is again restored to its normal value, the voltage relay 5 picks up and effects the energization of the control relay 6, which in turn effects the reconnection of the distribution circuit 1 to the supply circuit 2 and restores the normal connections of the regulators 19 and 20 so that the machines 10 and 11 operate as boosters to impress the proper charging voltages across the batteries B and B'.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a system of electric distribution, a source of direct current, a direct current distribution circuit connected to said source, a battery connected across said distribution circuit, a variable voltage device connected in series with said battery across said circuit, means for disconnecting said source from said circuit, and means for regulating said device so as to maintain a predetermined voltage across said battery in response to said source being connected to said distribution circuit and a predetermined voltage across said distribution circuit in response to said source being disconnected therefrom.

2. In a system of electric distribution, a source of direct current, a direct current distribution circuit connnected to said source, a battery connected across said distribution circuit, a direct current dynamoelectric machine connected in series with said battery across said circuit, means for disconnecting said source from said circuit, and means for regulating the voltage of said machine so as to maintain a predetermined voltage across said battery in response to said source being connected to said circuit and a predetermined voltage across said distribution circuit in response to said source being disconnected therefrom.

3. In a system of electric distribution, a source of direct current, a direct current distribution circuit connected to said source, a battery connected across said distribution circuit, a direct current dynamoelectric machine connected in series with said battery across said circuit, means for disconnecting said source from said circuit, means for regulating the excitation of said machine, and means for controlling said regulating means to maintain a predetermined voltage across said battery in response to said source being connected to said circuit and to maintain a different predetermined voltage across said circuit in response to said source being disconnected therefrom.

4. In a system of electric distribution, a source of direct current, a direct current distribution circuit connected to said source, a battery connected across said distribution circuit, a direct current dynamoelectric machine connected in series with said battery across said circuit, means for disconnecting said source from said circuit, means for regulating the excitation of said machine to maintain a predetermined voltage across said battery in response to said source being connected to said circuit and to maintain a different predetermined voltage across said circuit in response to said source being disconnected therefrom, including a relay having a voltage responsive winding, a plurality of resistors, and means for connecting said voltage responsive winding and one of said resistors across said battery in response to said source being connected to said circuit so that said relay responds to a battery voltage of a predetermined value and for connecting said voltage responsive winding and another of said resistors across said circuit in response to said source being disconnected therefrom so that said relay responds to a circuit voltage of a different predetermined value.

5. In a system of electric distribution, a three-wire source of direct current, a three-wire direct current distribution circuit, means for connecting said circuit to said source, means controlled by the voltage of said source for effecting the opening of said connecting means in response to said voltage decreasing below a predetermined value and for closing said connecting means in response to said voltage increasing above a predetermined value, two batteries respectively connected between the positive and neutral conductors and between the neutral and negative conductors of said circuit, a direct current motor connected between two conductors of said circuit and driving two direct current dynamoelectric machines the armature windings of which are respectively connected in series with said batteries, and means for respectively regulating the voltages of said machines so as to maintain a predetermined voltage across the associated series connected battery in response to said connecting means being closed and a predetermined voltage between the circuit conductors across which the respective machine and series connected battery are connected in response to said source being disconnected from said circuit.

6. In a system of electric distribution, a three-wire source of direct current, a three-wire direct current distribution circuit, means for connecting said circuit to said source, means controlled by the voltage of said source for effecting the opening of said connecting means in response to said voltage decreasing below a predetermined value and for closing said connecting means in response to said voltage increasing above a predetermined value, two batteries respectively connected between the positive and neutral conductors and between the neutral and negative conductors of said circuit, a direct current motor connected between two conductors of said circuit and driving two direct current dynamoelectric machines the armature windings of which are respectively connected in series with said batteries, a voltage regulator for each machine, and means for causing each voltage regulator to control the excitation of the associated machine so as to maintain a predetermined voltage across the associated series connected battery in response to said connecting means being closed and a predetermined voltage between the circuit conductors across which the associated machine and series connected battery are connected in response to said source being disconnected from said circuit.

HAROLD M. MARTIN.